US010753586B1

(12) United States Patent
Xu

(10) Patent No.: US 10,753,586 B1
(45) Date of Patent: Aug. 25, 2020

(54) LED LIGHT AND SMART DRIVING SYSTEM OF LED LIGHT

(71) Applicant: SHENZHEN SNC OPTO ELECTRONIC CO., LTD., Shenzhen (CN)

(72) Inventor: Jianjun Xu, Shenzhen (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 16/733,249

(22) Filed: Jan. 3, 2020

(30) Foreign Application Priority Data

Nov. 14, 2019 (CN) .......................... 2019 1 1062503

(51) Int. Cl.
*F21V 21/22* (2006.01)
*F16C 29/06* (2006.01)
*F21V 21/15* (2006.01)
*F21Y 115/10* (2016.01)

(52) U.S. Cl.
CPC .......... *F21V 21/22* (2013.01); *F16C 29/0616* (2013.01); *F21V 21/15* (2013.01); *F21Y 2115/10* (2016.08)

(58) Field of Classification Search
CPC .......... F21V 21/22; F21V 21/15; F21V 21/14; F21V 21/34; F16C 29/0616; F21Y 2115/10; F21S 8/028
USPC ...... 248/161, 274.1, 288.11, 297.21, 297.31, 248/220.21, 220.22, 223.31, 224.7, 224.8, 248/323, 327, 328, 333; 362/370, 371, 362/372, 249.09
See application file for complete search history.

(56) References Cited

U.S. PATENT DOCUMENTS

| | | | | | |
|---|---|---|---|---|---|
| 2,065,317 | A | * | 12/1936 | Knotschke | .............. F21V 21/22 248/327 |
| 2,963,255 | A | * | 12/1960 | Bobrick | .................... F21S 8/02 248/327 |
| 5,350,141 | A | * | 9/1994 | Perrault | .................. F16B 9/026 248/327 |
| 5,568,954 | A | * | 10/1996 | Burgess | .................... B25H 1/00 118/500 |
| 7,654,705 | B2 | * | 2/2010 | Czech | ....................... F21S 8/02 362/147 |
| 7,775,691 | B2 | * | 8/2010 | Burgei, Jr. | .............. F21S 8/028 362/153.1 |
| 8,920,003 | B2 | * | 12/2014 | Cheng | ..................... F21V 29/00 362/364 |

(Continued)

*Primary Examiner* — Terrell L McKinnon
*Assistant Examiner* — Michael McDuffie

(57) ABSTRACT

An LED light includes a body, a holder connected to the body, and a function extension unit detachably connected to the body. The holder includes a telescopic member stretched or contracted to adjust a length of the holder along an axial direction of the LED light. The present disclosure can solve technical problems that a conventional LED light can't be adapted to different installation environments. The function extension unit is configured to set different function modules to communicate with a power supply of the body according to needs of different customers so as to drive the body to change an output state of the power supply, thereby light emitting units of the body can work in different states. The present disclosure can further provide a smart driving system of an LED light to be customized to control a lighting mode of the body.

19 Claims, 16 Drawing Sheets

(56) References Cited

U.S. PATENT DOCUMENTS

| | | | | |
|---|---|---|---|---|
| 2010/0038509 A1* | 2/2010 | Russell | .................. | H04R 1/083 |
| | | | | 248/288.11 |
| 2012/0032047 A1* | 2/2012 | Bohanan | ............ | F16M 11/2021 |
| | | | | 248/288.11 |
| 2013/0248673 A1* | 9/2013 | Townsend, Jr. | ....... | F21V 21/008 |
| | | | | 248/327 |
| 2014/0027596 A1* | 1/2014 | Chang | .................... | F16M 13/00 |
| | | | | 248/333 |
| 2016/0341376 A1* | 11/2016 | Feit | ......................... | F21S 8/026 |
| 2017/0122534 A1* | 5/2017 | Ticktin | .................. | F21V 21/002 |

* cited by examiner

LED LIGHT AND SMART DRIVING SYSTEM OF LED LIGHT

BACKGROUND

1. Technical Field

The present disclosure generally relates to light sources field, and especially relates to a Light-Emitting Diode (LED) light and a smart driving system of a Light-Emitting Diode (LED) light which can conveniently adjust a length of an LED light along an axial direction of the LED light, easily install and work in different electrical environments.

2. Description of Related Art

LED lights are widely used in various light fields which are characterized of convenient control, energy-saving and long lifespan etc. During installing the LED light, it's needed to select suitable LED lights with different sizes and specifications according to actual environments, an overall length of a conventional LED light can't be adjusted. Therefore, sometimes, it is inevitable that the LED light can't be installed and used due to its size problem.

Furthermore, a conventional LED light includes a controller which is generally installed inside a body of the LED light so that the controller can't be removed when it's not needed, thereby it can't flexibly meet a market demand. In this condition, it's needed to respectively design the body with a controller and the body without a controller, which is too expensive and not suitable for storage and transportation, or increase storage and transportation costs.

On the other hand, consumers sometimes need to adjust a light color temperature of the LED light according to a usage environment or a seasonal change, for example, it's needed to adjust the light color temperature to a warm white light in winter, and adjust the light color temperature to a cold white light in summer. A conventional color temperature regulation technology is generally provided that a plurality of groups of LED light sets with different light color temperatures is arranged, and then a current of each group of LED light sets with different color temperatures is adjusted so that a brightness of each group of LED light sets with different color temperatures is different, thereby the color temperature regulation can be achieved.

SUMMARY

The disclosure relates to an LED light which can solve a technical problem that a conventional LED light can't be adapted to different installation environments due to its invariable size.

The Technical Solution Adopted for Solving Technical Problems of the Present Disclosure is:

an LED light includes a body and a holder with an end connecting to the body and an opposite end connecting to an utility network. The holder includes a connector and a telescopic member connected between the connector and the body. The telescopic member can be stretched or contracted to adjust a length of the holder along an axial direction of the LED light.

In the present disclosure, after the connector is plugged into the utility network, the length of the holder along the axial direction of the LED light can be adjusted by stretching or contracting the telescopic member, or the length of the holder along the axial direction of the LED light is first adjusted so as to meet an installation environment, and then the connector is plugged into the utility network. Or after the holder is installed, the length of the LED light along the axial direction of the LED light can be adjusted by stretching or contracting the telescopic member so that an LED light with different lighting ranges can be obtained. At the same time, the LED light of the present disclosure has a more wide adaptability without needing to design different LED lights with different sizes for meeting different installation environments, thereby costs of research and development and materials can be effectively reduced.

The LED light of the present disclosure which can further solve technical problems that a conventional LED light is difficult to extend its functions due to its single function, and some conventional LED lights have complex functions, difficulty detach their function units therein, and have high cost and low market competitiveness.

An LED light according to an embodiment of the present disclosure includes a body and a holder connected to the body. The body includes:

a shell fixed with the holder and including an inner cavity for receiving a power drive therein;

a connecting rod extending outward from the shell and communicated with the inner cavity;

a heat sink connected to the shell and surrounding around the outer of the connecting rod;

a light emitting unit fixed on the heat sink and electrically connected to the power drive; or the body further includes a function extension unit detachably connected to the connecting rod and electrically connected to the power drive, the function extension unit configured to receive signals and/or detect data and send electrical signals to the power drive to drive the light emitting unit to work in different states.

In the present disclosure, detachable function extension units can be added to the LED light according to actual needs of customers with high application complexity so as to meet different lighting environments and patterns; or an LED light without a function extension unit can be produced according to needs of customers with simple application functions, so as to reduce the cost and improve the competitiveness of the LED light. At the same time, an LED light without a function extension unit can be designed as a basic type of an LED light with a function extension unit. When customers need to apply an actual need with high application complexity, it is only needed to add a function extension unit to the basic LED light, which can be easier to arrange production and reduce costs. Thus, the present disclosure can solve technical problems that a conventional LED light is difficult to extend its functions due to its single function, and some conventional LED lights have complex functions, difficulty detach their function units therein, and have high cost and low market competitiveness.

A smart driving system of an LED light includes a power conversion unit and at least one string of LEDs electrically connected to a mains interface in turn, and the power conversion unit is configured to drive the LEDs to emit light.

The system further includes:

a triggering and signal detecting unit configured to obtain detecting signals via at least one detecting element and send out adjustment trigger signals according to the detecting signals;

an adjusting and control unit electrically connected to the triggering and signal detecting unit, and configured to receive the adjustment trigger signals transmitted from the triggering and signal detecting unit, and transform the adjustment trigger signals into adjustment commands and then send the adjustment commands to the power conversion unit; and the power conversion unit configured to make a driving change according to the adjusting commands so as to drive the LEDs to change a lighting state of the LEDs.

In the present disclosure, the triggering and signal detecting unit can be configured to obtain detecting signals via at least one detecting element to activate the trigger and signal detection unit, and then send out adjustment trigger signals to the adjusting and control unit, according to the detecting signals; after the adjustment trigger signals is processed by the adjusting and control unit, the adjusting and control unit is further configured to convert the adjustment trigger signals after being processed into the adjustment commands and then send the adjustment commands to the power conversion unit to change an output voltage of the power drive, so as to drive the LEDs to change its lighting state and realize lighting adaptation in different lighting environments. Such settings can be customized according to different detecting elements, or a wireless connection can be achieved by wireless communication elements, and the output voltage of the power conversion unit can be remotely controlled so that settings of diversified and differentiated lighting states can be achieved.

DETAILED DESCRIPTION

Figure 1:
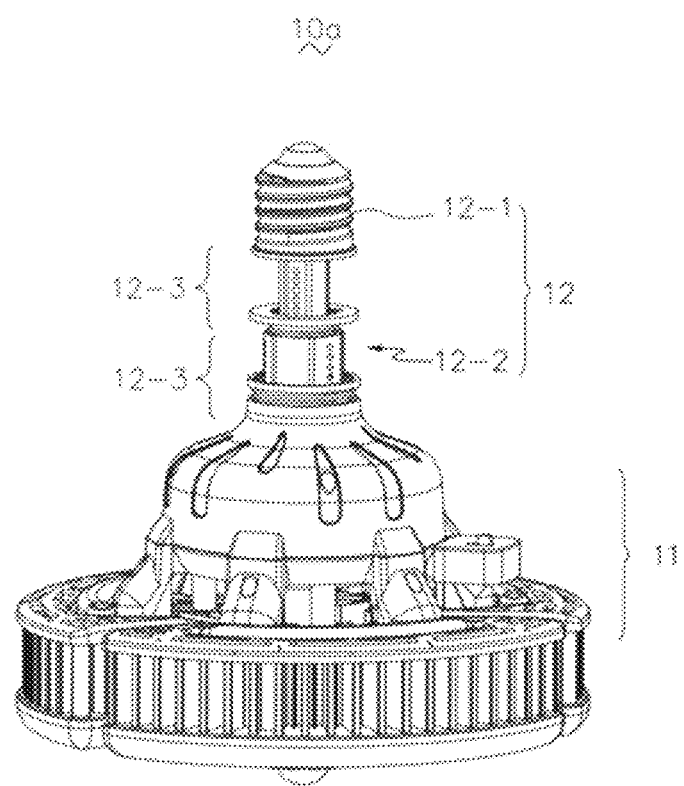
FIG. 1 is a schematic view of an LED light in accordance with an embodiment of the present disclosure.

The disclosure is illustrated by way of example and not by way of limitation in the figures of the accompanying drawings, in which like reference numerals indicate similar elements.

Figure 2:
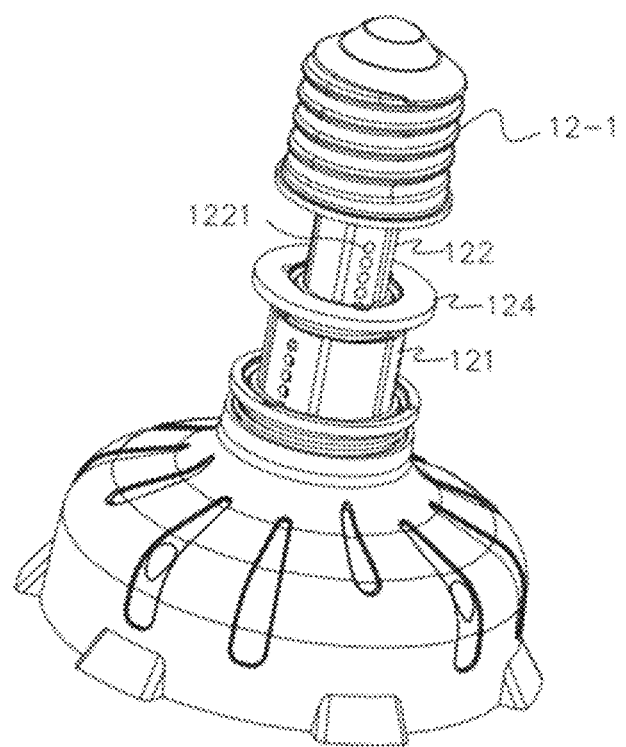
FIG. 2 is a schematic view of a holder of the LED light of FIG. 1.
Figure 3:
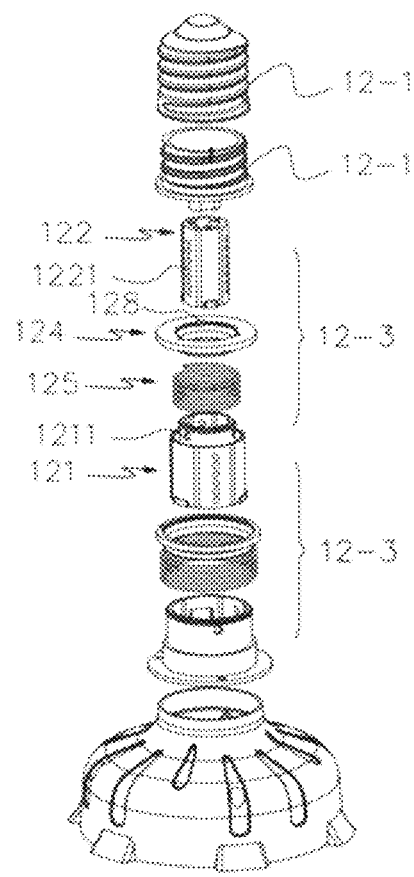
FIG. 3 is an exploded, schematic view of t the LED light of FIG. 2.
Figure 4:
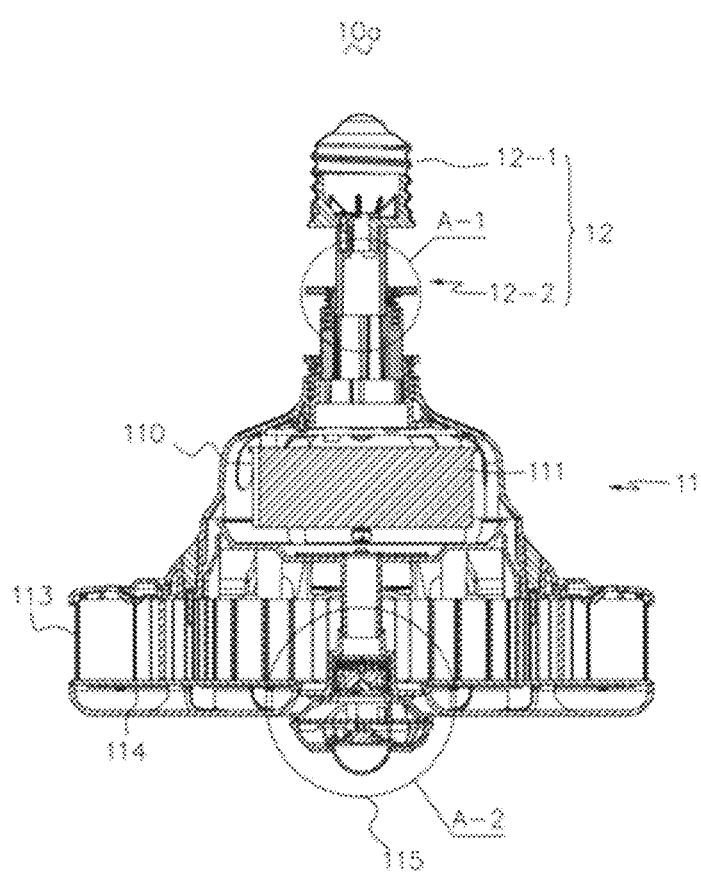
FIG. 4 is a cross-sectional view of the LED light along an axial direction of the LED light of FIG. 1.
Figure 5:
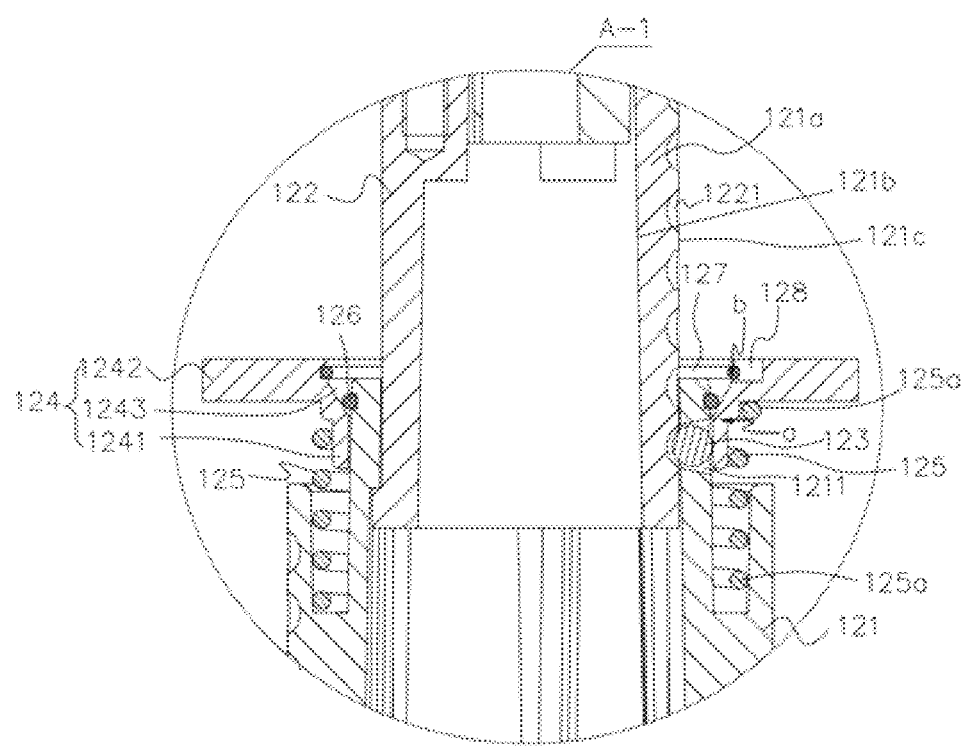
FIG. 5 is a partial enlarged schematic view of part A-1 of FIG. 4, focused on showing a first state A.
Figure 6:
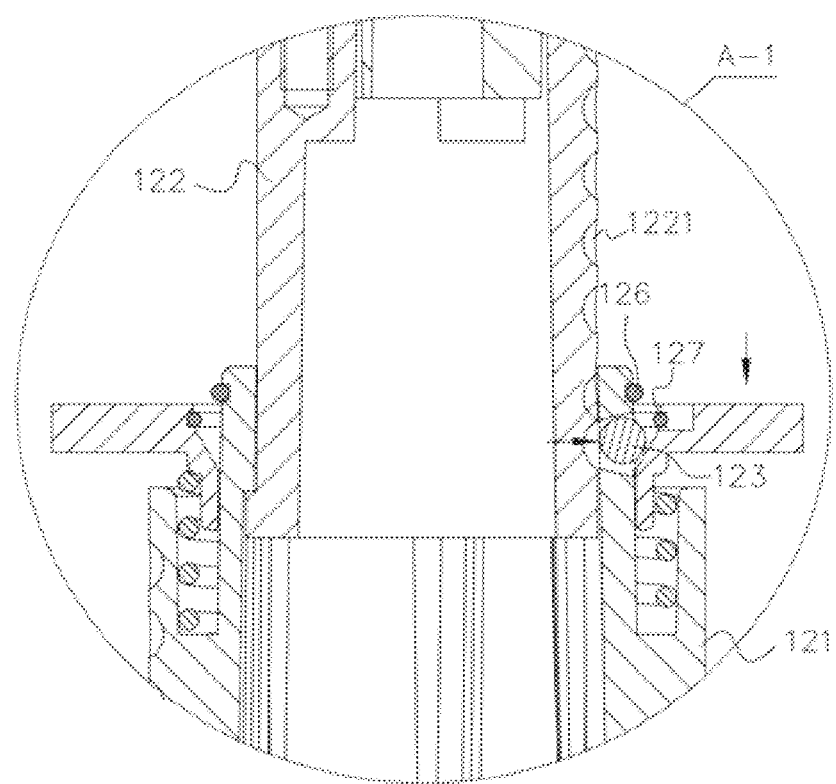
FIG. 6 is also a partial enlarged schematic view of part A-1 of FIG. 4, but focused on showing a second state B.

Referring to FIG. 1 and FIG. 2, an LED light 10a in accordance with an embodiment of the present disclosure includes a body 11 and a holder 12 with an end connecting to the body 11 and an opposite end connecting to an utility network. The holder 12 includes a connector 12-1, and a telescopic member 12-2 with one portion connecting to the connector 12-1 and the other portion connecting to the body 11. The telescopic member 12-2 can be stretched or contracted to adjust a length of the holder 12 along an axial direction of the LED light 10a.

Furthermore, after the connector 12-1 is plugged into the utility network, the length of the holder 12 along the axial direction of the LED light 10a can be adjusted by stretching or contracting the telescopic member 12-2, or the length of the holder 12 along the axial direction of the LED light 10a is first adjusted so as to meet an installation environment, and then the connector 12-1 is plugged into the utility network. Or after the holder 12 is installed, the length of the LED light 10a along the axial direction of the LED light 10a is adjusted by stretching or contracting the telescopic member 12-2 so that different lighting ranges of the LED light 10a can be obtained. At the same time, the LED light 10a of the present disclosure has a more wide adaptability without needing to design different LED lights with different sizes for meeting different installation environments, thereby costs of research and development and materials can be effectively reduced.

Referring to FIGS. 2-6, furthermore, the telescopic member 12-2 includes at least one telescopic unit 12-3. The at least one telescopic unit 12-3 includes a sleeve 121, a ball 123, a sliding member 122 arranged in the sleeve 121 and sliding relative to the sleeve 121, and an adjusting ring 124 sleeved around the sleeve 121.

Preferably, the sleeve 121 includes a receiving hole 1211 formed on a sidewall 121a thereof. A bore diameter of the receiving hole 1211 is gradually increased from an inner wall 121b of the sleeve 121 to an outer wall 121c of the sleeve 121. The bore diameter of the receiving hole 121l on the inner wall 121b of the sleeve 121 is less than a diameter of the ball 123, and the bore diameter of the receiving hole 1211 on the outer wall 121c of the sleeve 121 is greater than the diameter of the ball 123.

Preferably, the ball 123 is movably received in the receiving hole 1211, and a moving direction of the ball 123 is perpendicular to a sliding direction of the sleeve 121.

In an embodiment of the present disclosure, during the ball 123 moving within the receiving hole 1211, when the ball 123 is moved towards the inner wall 121b of the sleeve 121, it is limited by the receiving hole 1211 with its bore diameter less than the diameter of the ball 123, so that the ball 123 can be prevented from falling off the inner wall 121*b* of the sleeve 121. When the ball 123 is moved towards the outer wall 121*c* of the sleeve 121, it is restrained by the adjusting ring 124 so that the ball 123 can be prevented from falling off from a side of the receiving hole 1211 with its bore diameter greater than the diameter of the ball 123. In this way, the ball 123 can only horizontally move in a small range within the receiving hole 1211.

Preferably, the adjusting ring 124 can slide relative to the sleeve 121 to drive the ball 13 to move in the receiving hole 1211 during a sliding process.

Furthermore, the sliding member 122 includes at least one inner recess 122*l* formed along a sliding direction thereof and opposite to the receiving hole 1211. At this time, in a first state A, when the ball 123 is moved to a maximum restricted position towards the inner wall 121*b* of the sleeve 121, a surface of the ball 123 located on a side of the inner wall 121*b* of the sleeve 121 is protruded out of the inner wall 121*b* of the sleeve 121, and is pressed on the inner recess 122*l* under an action of the adjusting ring 124. Thus, an integral structure formed by the ball 123 and the sleeve 121 is prevented from sliding relative to the sliding member 122, so as to position the sliding member 122 on the sleeve 121. That is, the adjusting ring 124 can press the ball 123 into the inner recess 122*l* to position the telescopic member 12-2 after the telescopic member 12-2 is stretched or contracted.

Meanwhile, in a second state B: when the ball 123 is moved to a maximum restricted position towards the outer wall 121*c* of the sleeve 121, a surface located within the inner wall 121*b* of the sleeve 121 is received in the sleeve 121 so that the ball 123 is recovered from the inner recess 122*l*. At this time, the length of the telescopic member 12-2 along the axial direction of the LED light 10*a* can be adjusted by stretching or contracting the sliding member 122 and the sleeve 121, until the ball 123 is again pressed on the inner recess 122*l* to position the telescopic member 12-2 after the telescopic member 12-2 is stretched or contracted.

In an embodiment of the present disclosure, a plurality of inner recesses 122*l* is arranged in vertical rows on the sliding member 122. The inner recess 122*l* is opposite to the receiving hole 1211 when the sliding member 122 is sliding. The ball 123 is resisted against any one of the plurality of inner recesses 122*l* to position the telescopic member 12-2 after the telescopic unit 12-3 is stretched or contracted. At this time, each inner recess 122*l* is equivalent to a telescopic adjusting gear so as to obtain multi-gear adjustments.

In another embodiment of the present disclosure, two receiving holes 1211 are arranged on two opposite sides of the sleeve 121, and the plurality of inner recesses 122*l* is arranged in two vertical rows so that each vertical row of the inner recesses 122*l* opposite to one receiving hole 1211. When the sliding member 122 is slid in the sleeve 121, a pair of balls 123 located in the two receiving holes 1211 is respectively resisted against a corresponding vertical row of inner recesses 122*l* so as to achieve a two-way location on both sides of the LED light 10*a*, thereby it can effectively avoid the sliding member 122 from sliding relative to the sleeve 121 after positioning the sliding member 122 and the sleeve 121, that is, it can effectively avoid a single ball 123 from falling off from the inner recess 122*l* and reduce a shaking between the sliding member 122 and the sleeve 121.

In the present disclosure, the sliding member 124 is provided for moving the ball 123 in the receiving hole 1211, and further includes: a vertical surface 1241 sleeved around the outer wall 121*c* of the sleeve 121 and sliding on the outer wall 121*c* of the sleeve 121, a horizontal surface 1242 perpendicular to the outer wall 121*c* of the sleeve 121, and a slant surface 1243 connected between the vertical surface 1241 and the horizontal surface 1242. The slant surface 1243 includes a first end a connected to the vertical surface 1241 and a second end b connected to the horizontal surface 1242.

The first state A: when the vertical surface 1241 is located outside the receiving hole 1211, the vertical surface 1241 is pressed on a side of the ball 123 towards the outer wall 121*c* of the sleeve 121, so that the ball 123 is pressed to move towards the inner wall 121*b* of the sleeve 121 and protruded out of the inner wall 121*b* of the sleeve 121 to resist against the inner recess 122*l* so as to obtain a limitation therebetween.

The second state B: when the slant surface 1243 is located outside the receiving hole 1211, a sidewall of the sliding member 122 is pressed on the side of the ball 123 close to the inner wall 121*b* of the sleeve 121 during sliding the sliding member 122, the ball 123 is slid within the receiving hole 1211 towards the outer wall 121*c* of the sleeve 121 until it is slid to connect with the slant surface 1243. At this time, the side of the ball 123 located near the inner wall 121*b* of the sleeve 121 is received in the sleeve 121 so that the sliding member 122 and the sleeve 121 can slide to each other, thereby the telescopic member 12-2 can be adjusted to stretch or contract.

Furthermore, the LED light 10*a* further includes an elastic element 125 configured to push the adjusting ring 124 away from the sleeve 121. One end 125*a* of the elastic element 125 is connected with the sleeve 121 and the other end 125*b* of the elastic element 125 is resisted against the bottom of the horizontal surface 1242. The sleeve 121 includes a first limiting ring 126 positioned above the first end a and protruding out of the outer wall 121*c* of the sleeve 121.

In an embodiment of the present disclosure, the ball 123 moves from the slant surface 1243 connected with the ball 123 towards the inner wall 121*b* of the sleeve 121, that is, when the ball 123 is reverted from the second state B to the first state A, the adjusting ring 124 moves away from the sleeve 121 under an action of the elastic element 125 so that the vertical surface 1242 is moved out of the receiving hole 1211 and the ball 123 is followed to move, in this way, the elastic element 125 is played as a role of restoring the sliding regulating ring 124. At the same time, when the first end a of the adjusting ring 124 is moved to a position of the first limiting ring 126, the first end a of the adjusting ring 124 is resisted against the first limiting ring 126 protruding out of the outer wall 121*c* of the sleeve 121, thereby the adjusting ring 124 can be prevented by the first limiting ring 126 from further moving away from the sleeve 121 to avoid the adjusting ring 124 from falling off the sleeve 121.

Preferably, the adjusting ring 124 includes a second limiting ring 127 formed on the second end b thereof and protruding out of the slant surface 1243; a distance between the second limiting ring 127 and the outer wall 121*c* of the sleeve 121 is less than the diameter of the ball 123.

In an embodiment of the present disclosure, when a state of the vertical surface 1241 located outside the receiving hole 1211 is changed to a state of the slant surface 1243 located outside the receiving hole 1211, when the ball 123 moves from the outer of the sleeve 121 to the slant surface 1243, that is, the ball 123 is changed from the first state A to the second state B, the adjusting ring 124 is moved downwardly, that is, the adjusting ring 124 is moved towards a direction of compressing the elastic element 125. At this time, when the ball 123 is located on the slant surface 1243 and resisted against the second limit ring 127, the ball 123 can be prevented by the second limiting ring 127 from falling off the slant surface 1243 since the distance between the second limiting ring 127 and the outer wall 121c of the sleeve 121 is less than the diameter of the ball 123.

Furthermore, the adjusting ring 124 includes an opening 128 formed from the horizontal surface 1242 along the slant surface 1243 and opposite to the receiving hole. 1211 When the adjusting ring 124 is slid, that is, when the slant surface 1243 is slid to the outer of the receiving hole 1211, the ball 123 is rolled into the receiving hole 1211 from the opening 128.

In an embodiment of the present disclosure, an installation process of the telescopic unit 12-3 is as follows:

1) the sliding member 122 is sleeved in the sleeve 121;
2) the adjusting ring 124 is sleeved around the sleeve 121;
3) the elastic element 125 is installed between the sleeve 121 and the adjusting ring 124;
4) the adjusting ring 124 is adjusted until the slant surface 1243 is located outside the receiving hole 1211;
5) the ball 123 is inserted from the opening 128 and then rolled into the receiving hole 1211 along the opening 128 and the slant surface 1243;
6) the first limiting ring 126 is arranged on the sleeve 121 and positioned above the first end a of the adjusting ring 124; and
7) the second limiting ring 127 is arranged above the second end b of the adjusting ring 124.

Through the above installation process, the ball 123 can enter the receiving hole 1211 to move within the receiving hole 1211 without falling off from the receiving hole 1211. At the same time, the adjusting ring 124 is manually moved to a compression position of the elastic element 125 so that the adjusting ring 124 can be automatically recovered to its original position by the elastic element 125 after the sliding member 122 and the sleeve 121 are adjusted, thereby the sliding member 122 can be positioned on the sleeve 121. Thus, the above whole installation process is simple, coherent and distinct.

Furthermore, in an embodiment of the present disclosure, the telescopic member 12-2 includes a plurality of telescopic units 12-3, and a sleeve 121 of one telescopic unit 12-3 is used as a sliding member 122 connected to the other telescopic unit 12-3. The plurality of the telescopic units 12-3 are stackably sleeved together to adjust the length of the LED light 10a within a larger length range.

Figure 7:
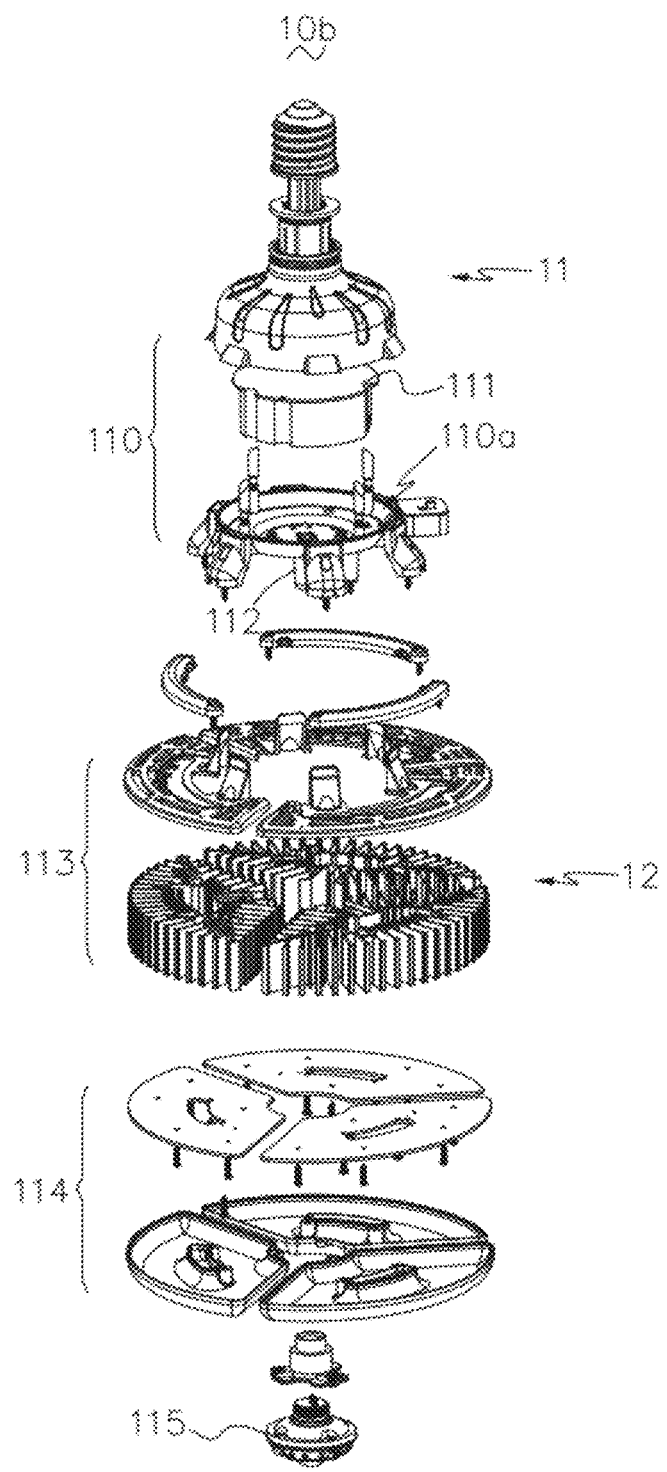
FIG. 7 is an exploded, schematic view of the LED light of FIG. 1.
Figure 8:
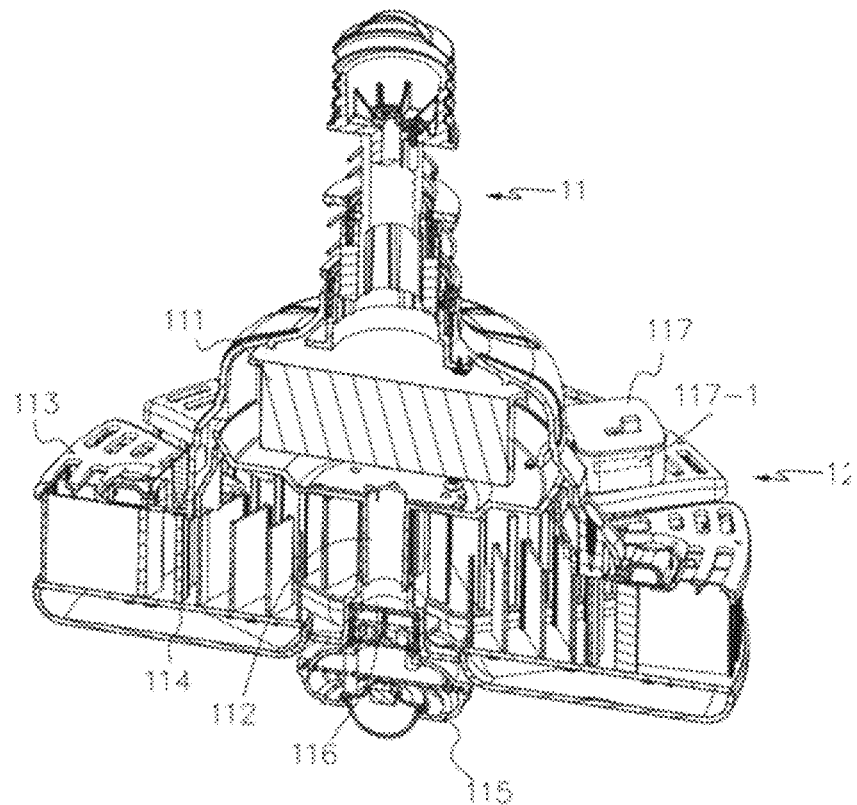
FIG. 8 is an exploded, cross-sectional view along the axial direction of the LED light of FIG. 1.

Referring to FIG. 7 and FIG. 8, an LED light 10a in accordance with an embodiment of the present disclosure includes a body 11 and a holder 12 connected to the body 11. The body 11 includes a shell 110, a power drive 111, a connecting rod 112 a heat sink 113 and a light emitting unit 114.

Preferably, the shell 110 is fixed with the holder 12 and includes an inner cavity 110a for receiving the power drive 111 therein. The connecting rod 112 extends outward from the shell 110 and communicated with the inner cavity 110a; the heat sink 113 is connected to the shell 110 and surrounds around the outer of the connecting rod 112; and the light emitting unit 114 is fixed on the heat sink 113 and electrically connected to the power drive 111.

In an embodiment of the present disclosure, the heat sink 113 is distributed outside the connecting rod 112 and connected with an end of the connecting rod 112 extending downwardly, in this way, an upper end of the heat sink 113 is connected to the shell 110, and a lower end of the heat sink 113 is fixed with the connecting rod 112 to increase a strength of the LED light 10a.

Furthermore, in an embodiment of the present disclosure, a function extension unit 115 can be added to the connecting rod 112 according to actual requirements of customers, specifically, the function extension unit 115 can be detachably connected to the connecting rod 112 and electrically connected to the power drive 111, and be configured to receive signals and/or detect data and send electrical signals to the power drive 111 to drive the light emitting unit 114 to work in different states.

In an embodiment of the present disclosure, detachable function extension units 115 can be added according to actual needs of customers with high application complexity so as to meet different lighting environments and patterns; or an LED light 10a without a function extension unit 115 can be produced according to needs of customers with simple application functions, so as to reduce the cost and improve the competitiveness of the LED light 10a. At the same time, an LED light 10a without a function extension unit 115 can be designed as a basic type of an LED light 10a with a function extension unit 115. When customers need to apply an actual need with high application complexity, it is only needed to add a function extension unit 115 to the basic LED light 10a, which can be easier to arrange production and reduce costs. Thus, the present disclosure can solve technical problems that a conventional LED light is difficult to extend its functions due to its single function, and some conventional LED lights have complex functions, difficulty detach their function units therein, and have high cost and low market competitiveness.

Figure 9:
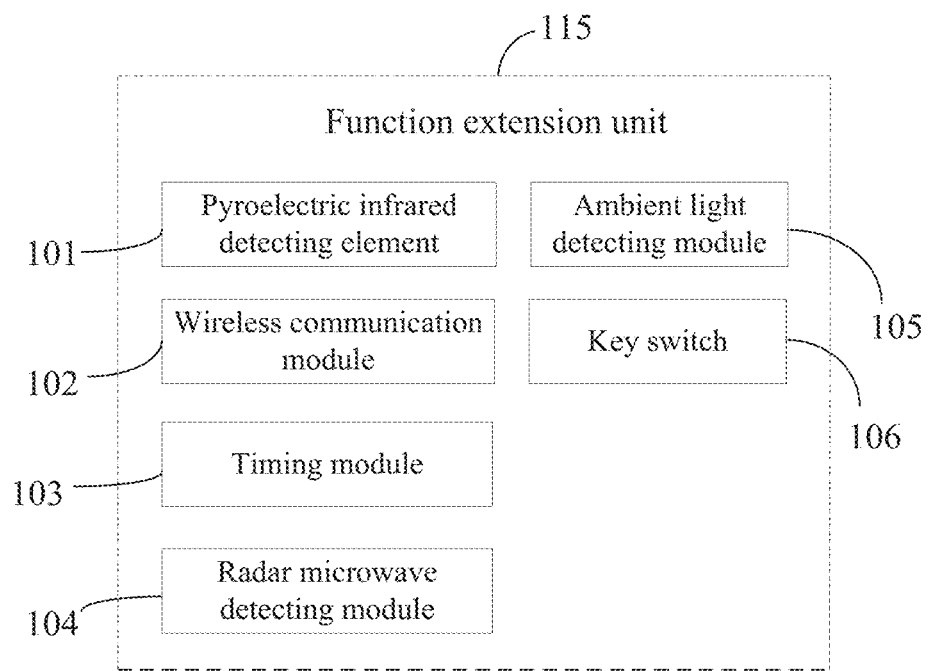
FIG. 9 is a function block diagram of a function extension unit of an LED light in accordance with an embodiment of the present disclosure.

Referring to FIG. 9, in an embodiment of the present disclosure, the function extension unit 115 includes a pyroelectric infrared detecting element 101 configured to detect within a certain range below the LED light 10a, and send a signal to the power drive 111 to drive the power drive 111 to work when an object with a moving infrared characteristic data is found. At this time, the LED light 10a is on, and at other times, the power drive 111 is partially in a standby state to reduce power consumption.

In an embodiment of the present disclosure, the function extension unit 115 includes a wireless communication module 102 connected with a control terminal to receive a control signal of the control terminal and configured to send the control signal to the power drive 111, so that the power drive 111 is controlled in a specific working state according to the control signal of the control terminal.

in an embodiment of the present disclosure, the function extension unit 115 includes a timing module 103 configured to detect a lighting time of the LED light 10a and then send a timing signal to the power drive 111 so as to drive the power drive 111 to regularly or delay turn off the LED light 10a.

in an embodiment of the present disclosure, the function extension unit 115 includes a radar microwave detecting module 104 configured to detect whether there is a moving object within a certain range of the LED light 10a, and then send a detection signal to the power drive 111, so that the power drive 111 can work according to a preset driving state to light or adjust a lighting effect of the LED light 10a.

in an embodiment of the present disclosure, the function extension unit 115 includes an ambient light detecting module 105 configured to detect ambient light quantity of the LED light 10a and then send a detecting signal to the power driver 111, so that the power drive 111 can work according to the preset driving state to light or adjust the lighting effect of the LED light 10a.

In an embodiment of the present disclosure, the function extension unit 115 includes two or more combinations which include the above pyroelectric infrared detecting element 101, the wireless communication module 102, the timing module 103, the radar microwave detecting module 104 and the ambient light detecting module 105.

Figure 10:
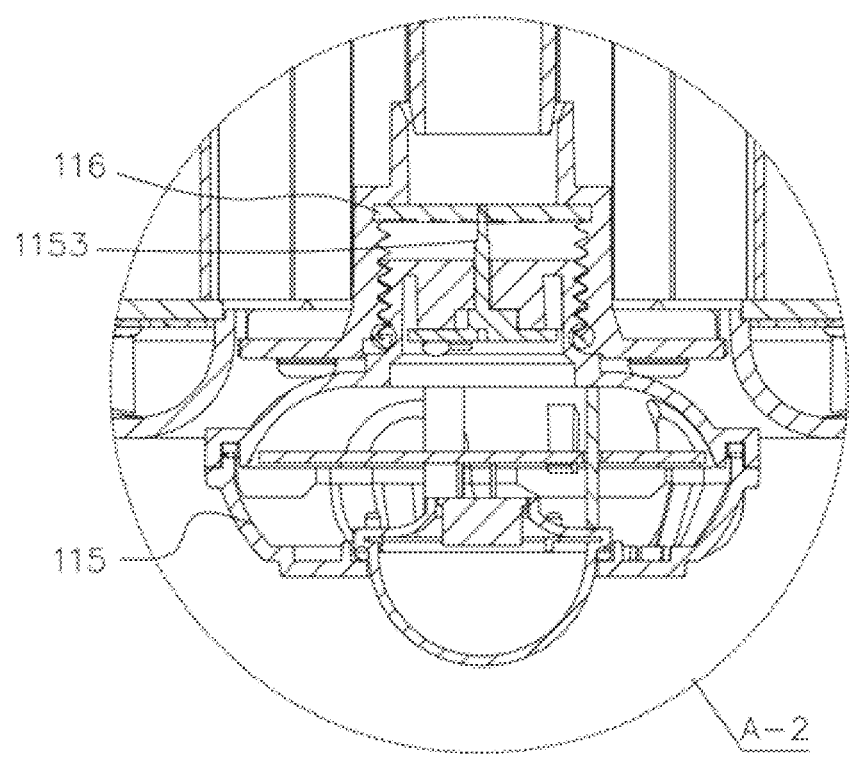
FIG. 10 is a partial enlarged schematic view of part A-2 of FIG. 4.
Figure 11:
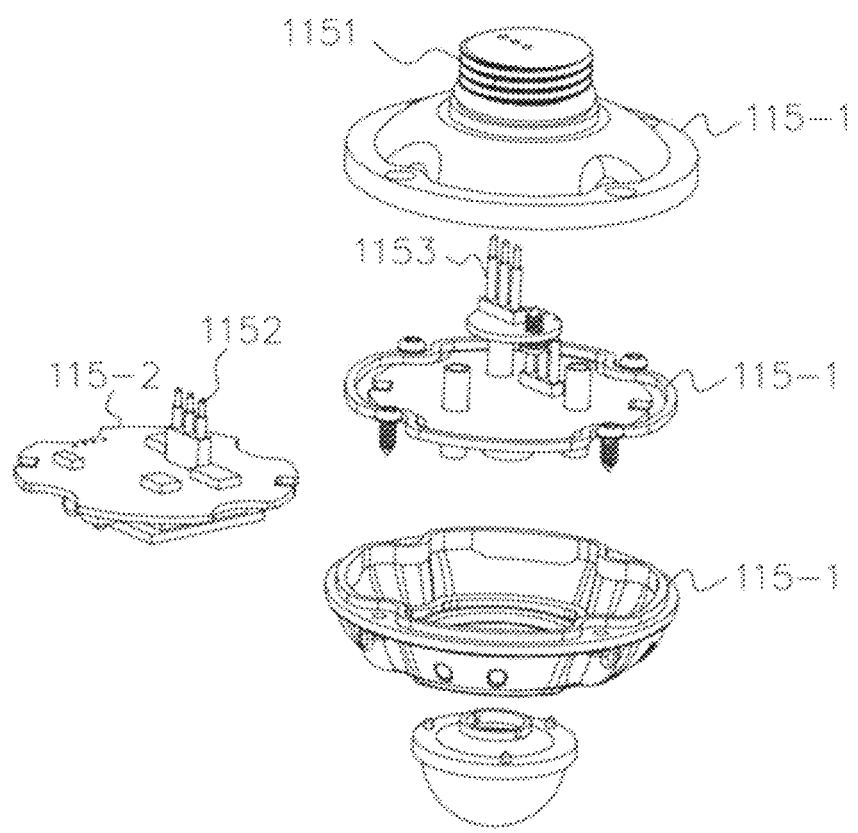
FIG. 11 is an exploded, schematic view of the function extension unit of the LED light of the present disclosure.
Figure 12:
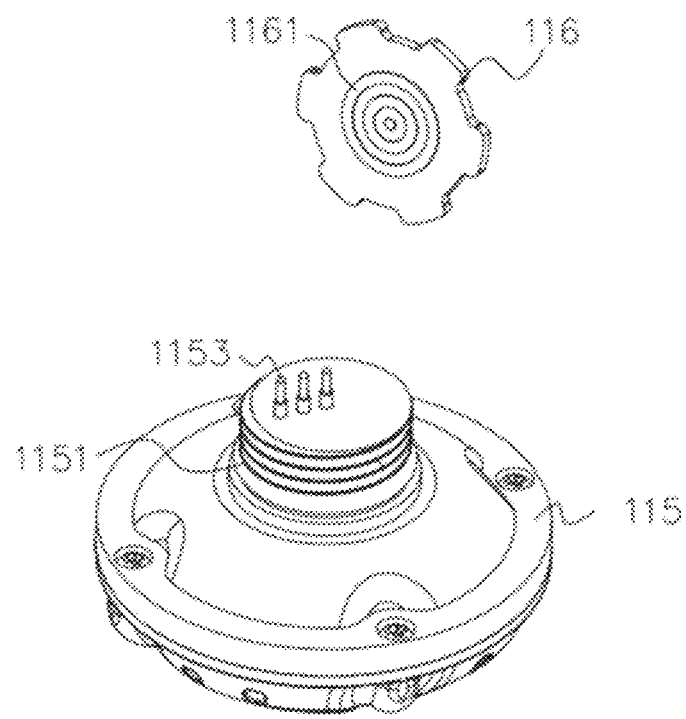
FIG. 12 is a schematic view of the function extension unit and a connecting plate of the LED light of the present disclosure.

Referring to FIGS. 10-12, the connecting rod 112 includes a connecting plate 116 formed on an end thereof far away from the shell 110. The connecting plate 116 includes at least two conducting rings 1161 concentrically insulated from each other and respectively connected to the power drive 111 by a corresponding cable;

the function extension unit 115 further includes a housing 115-1 and a first function board 115-2.

Furthermore, the housing 115-1 includes a connecting portion 1151 fixed with the connecting rod 112; the first function board 115-2 is arranged in the housing 115-1 and includes a pin 1152 electrically connected to the conducting ring 1161 and extending outward from the housing 115-1. The pin 1152 is contact with the conducting ring 1161 when the housing 115-1 is connected to the connecting rod 112 so as to transmit electrical signals between the function extension unit 115 and the connecting rod 112.

Preferably, the pin 1152 is made of elastic material and includes a plurality of terminals 1153 formed thereon, and a number of the terminals 1153 is same as that of the conducting rings 1161. When the housing 115-1 is fixed with the connecting rod 112, the elastic pin 1152 is resisted against the conducting ring 1161 to improve a conductivity of the LED light 10a and prevent an emergence of an open circuit of the LED light 10a.

In an embodiment of the present disclosure, the function extension unit 115 can't be installed on the connecting rod 112, but can be set according to the actual requirements of customers.

In an embodiment of the present disclosure, according to the actual requirements, one or more combinations of the pyroelectric infrared detecting element 101, the wireless communication module 102, the timing module 103 and the radar microwave detecting module 104 can be arranged on the first function board 115-2.

Referring to FIG. 8, in another embodiment of the present disclosure, the LED light 10a further includes a control box 117 detachably fixed with the shell 110. The control box 117 includes a second function board 117-1 electrically connected to the power drive 111 to adjust a work state of the power drive 111. Furthermore, the control box 117 is provided for a function same as that of extension unit 115. The control box 117 includes one or more combinations of the pyroelectric infrared detecting element 101, the wireless communication module 102, the timing module 103, the radar microwave detecting module 104 and the ambient light detecting module 105, so as to customizationally adjust functions of the power drive 111 to change the lighting effect of the LED light 10a.

In an embodiment of the present disclosure, each of the function extension unit 115 and the control box 117 can include a key switch 106 configured to change the working state of the power drive 111 so as to adjust the lighting effect of the LED light 10a, such as an adjustment of a color temperature of the LED light 10a.

Figure 13:
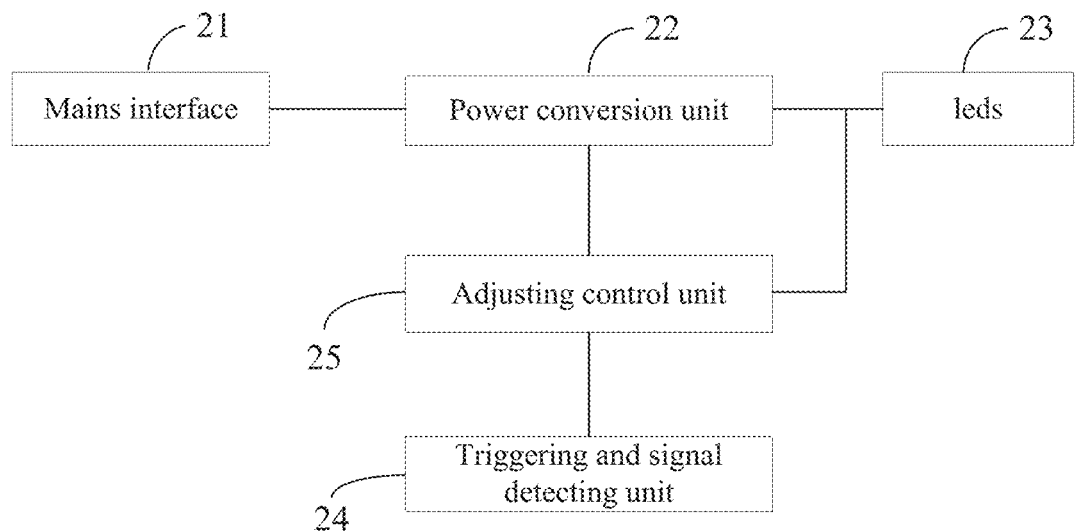
FIG. 13 is a block diagram of a smart driving system of an LED light in accordance with an embodiment of the present disclosure.

Referring to FIG. 13, a smart driving system 20 of an LED light 10a in accordance with an embodiment of the present disclosure includes a power conversion unit 22 and at least one string of LEDs 23 electrically connected to a mains interface 21 in turn, and the power conversion unit 22 is configured to drive the LEDs 23 to emit light.

The smart driving system 20 further includes a triggering and signal detecting unit 24 and an adjusting and control unit 25 electrically connected to the power conversion unit 22 and the triggering and signal detecting unit 24.

The triggering and signal detecting unit 24 is configured to obtain detecting signals via at least one detecting element and send out adjustment trigger signals according to the detecting signals. The adjusting and control unit 25 is configured to receive the adjustment trigger signals transmitted from the triggering and signal detecting unit 24, and transform the adjustment trigger signals into adjustment commands and then send the adjustment commands to the power conversion unit 22. The power conversion unit 22 is configured to make a driving change according to the adjusting commands so as to drive the LEDs 23 to change a lighting state of the LEDs 23 and obtain lighting adaptation in different lighting environments. The LED light 10a can be customized according to different detecting elements, or a wireless connection can be achieved by wireless communication elements, and an output voltage of the power conversion unit 22 can be remotely controlled so that settings of diversified and differentiated lighting states of the LED light 10a can be achieved.

In an embodiment of the present disclosure, there are two or more strings of LEDs 23, and the power conversion unit 22 is configured to drive at least one string of LEDs 23 to change the lighting state of the at least one string of LEDs 23 after receiving the adjustment commands, so as to change the light state of the LED light 10a.

Furthermore, the driving change made by the power conversion unit 22 includes: a duty ratio of driving electrical signals is changed so as to change a lighting color temperature of the LEDs 23.

In an embodiment of the present disclosure, two strings of LEDs 23 can be driven by a pulse width modulation (PWM) signal to light. In the first state A, during a second of the pulse width modulation signal, a square wave at a positive voltage is 0.6 seconds, and a square wave at a negative voltage is 0.4 seconds, that is, a duty ratio of the pulse width modulation signal is 60% and the two strings of LEDs 23 emits a cold white light. While, in the second state B, during a same second of the pulse width modulation signal, the square wave at a positive voltage is 0.7 seconds, and a square wave at a negative voltage is 0.3 seconds, that is, a duty ratio of the pulse width modulation signal is 70% and the two strings of LEDs 23 emits a warm white light. Furthermore, the power conversion unit 22 is configured to make a driving change to change at least one of the two pulse width modulation signals with 60% duty ratio supplying power for the two strings of LEDs 23 to the second state B, that is, the duty ratio of the pulse width modulation signal supplying power for one of the two strings of LEDs 23 is changed to 70%. After that, the two strings of LEDs 23 are respectively emits the cold white light and the warm white light. In a comprehensive spectrum, the LED light 10a can emit light different from the first cold white light and tended to a warm white light, thus the color temperature of the LED light 10a can be adjusted.

Figure 14:
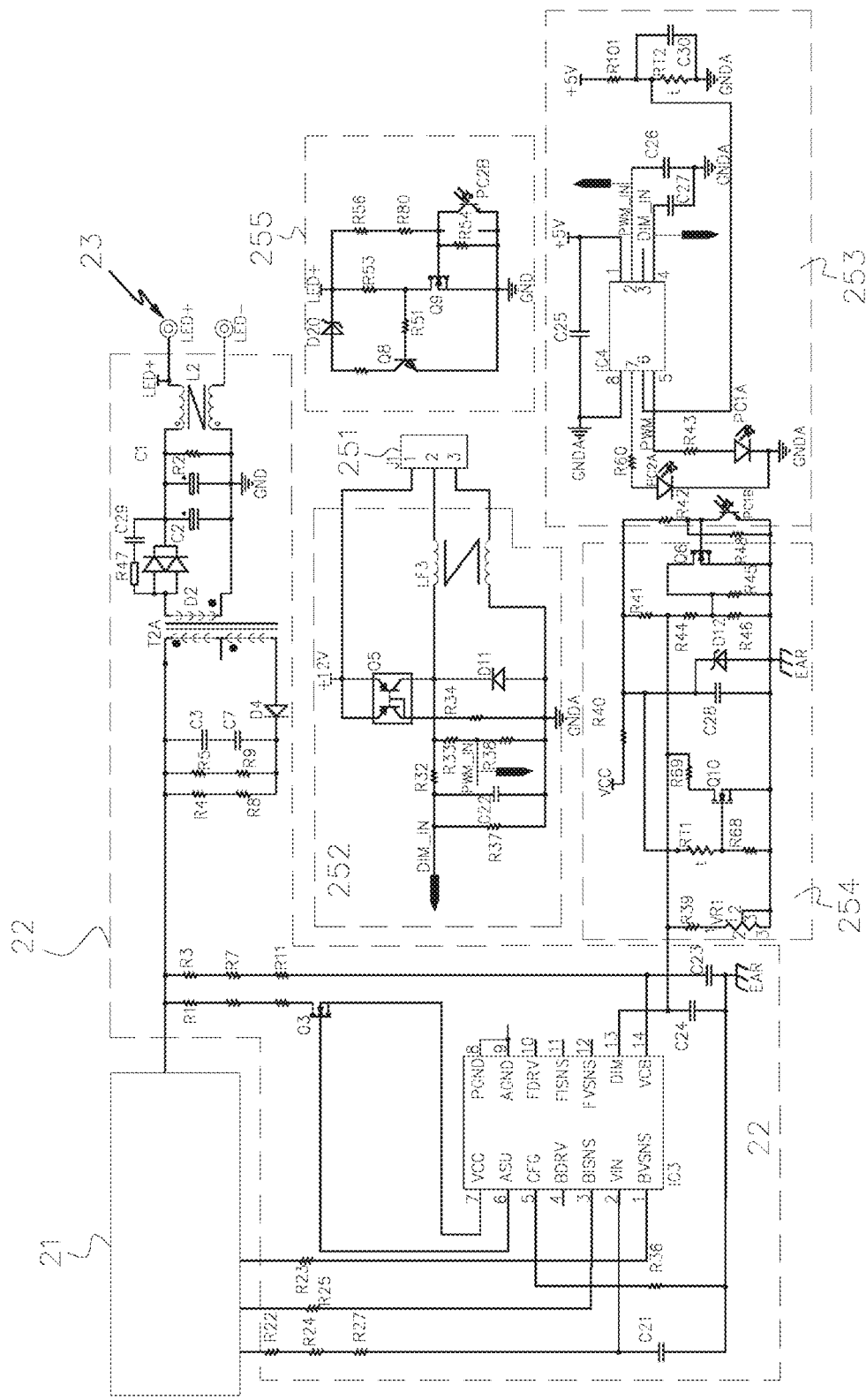
FIG. 14 is a circuit diagram of an adjusting and control unit of the smart driving system of the present disclosure.

Referring to FIG. 14, the adjusting and control unit 25 includes a first port 251, a differential input module 252, an optocoupler conversion module 253, a front-end changing module 254 and/or a back-end changing module 255.

Specifically, in an embodiment of the present disclosure, the first port 251 is configured to receive the adjustment trigger signals transmitted from the triggering and signal detecting unit 24. In an embodiment of the present disclosure, the first port 251 is the pin 1152 and the conducting ring 1161 in contact with the pin 1152, the adjusting and control unit 25 is received in the inner cavity 110a and played as a part of the power drive 111. In other embodiments of the present disclosure, the adjusting and control unit 25 can be independent of the power drive 111 and can also be set in the function extension unit 115 and/or the control box 117.

Preferably, the differential input module 252 is electrically connected to a back-end of the first port 251 and configured to remove interferences and improve a signal sensitivity of the LED light 10a. The optocoupler conversion module 253 is configured to receive differential signals transmitted from the differential input module 252 and convert the differential signals into coupling signals. The front-end changing module 254 is configured to receive the coupling signals transmitted from the optocoupler conversion module 253 and process the coupling signals, and then send the coupling signals after being processed to the power conversion unit 22 so that the power conversion unit 22 can make the driving changes according to the coupling signals. The back-end changing module 255 is configured to receive the coupling signals and process the coupling signals, and then send the coupling signals after being processed to a front-end of the LEDs 23 so as to change the lighting state of the LEDs 23.

Figure 15:
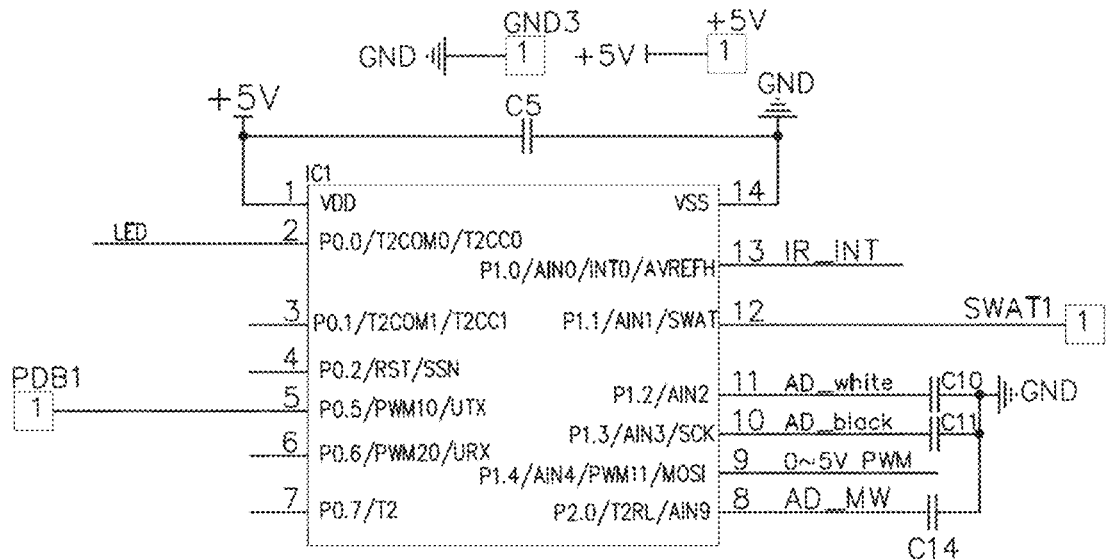
FIG. 15 is a partial circuit diagram of a triggering and signal detecting unit of the smart driving system of the present disclosure.

Referring to FIG. 15, furthermore, the trigger and signal detecting unit 24 includes a control chip 241, and the control chip 241 includes an adjusting output PWM, and a data matching module 2411 connected between the adjusting output PWM and the first port 251, and configured to receive electrical signals of the adjusting output PWM and convert the electrical signals into the adjustment trigger signals and then send the adjustment trigger signals to the first port 251.

Figure 16:
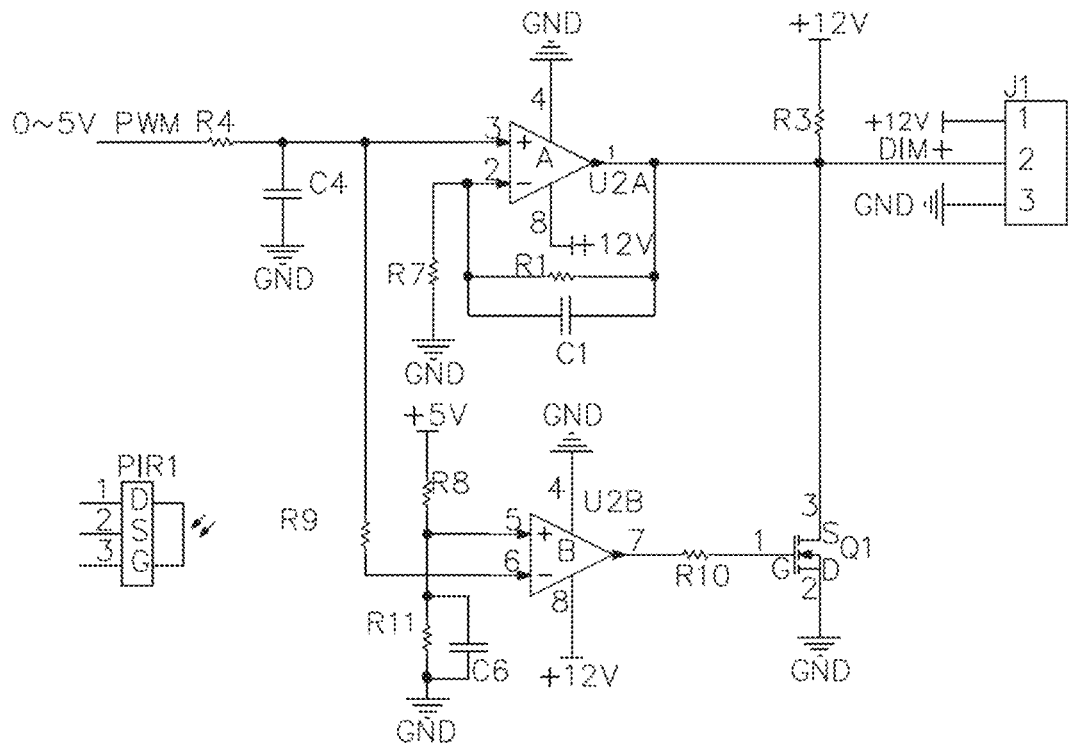
FIG. 16 is a connection circuit diagram of a button and a control chip of the smart driving system of the present disclosure.

Referring to FIG. 16, in an embodiment of the present disclosure, the control chip 241 further includes a first entering end PHOTO electrically connected to a button SWAT. The button SWAT is configured to trigger the control chip 241 to work and the adjusting output PWM is configured to output the electrical signals.

Figure 17:
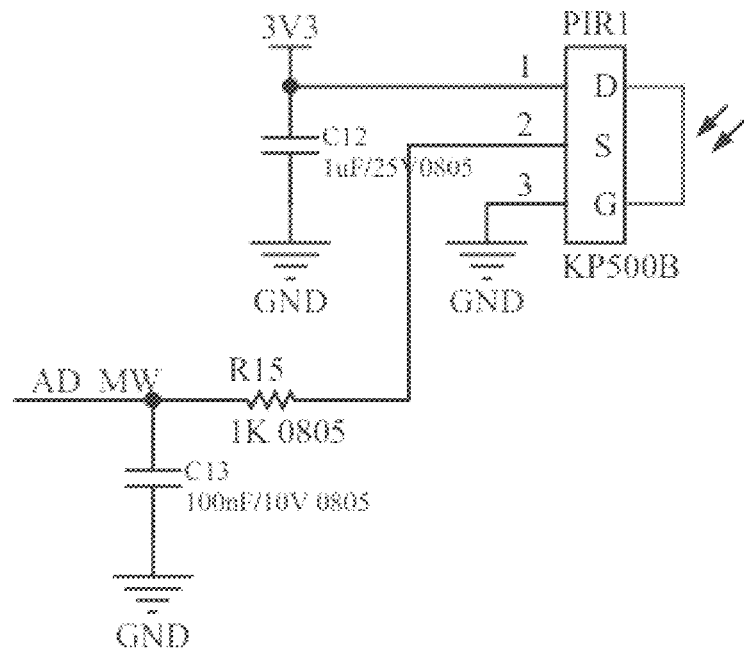
FIG. 17 is a connection circuit diagram of a pyroelectric infrared element and the control chip of the smart driving system of the present disclosure.

Referring to FIG. 17, in an embodiment of the present disclosure, the control chip 241 further includes a second entering end AD MW electrically connected to a pyroelectric infrared element PIRI, and the pyroelectric infrared element PIRI is configured to detect a moving infrared signal and output the adjustment trigger signals to trigger the control chip 241 to work, and the adjusting output PWM is configured to output the electrical signals.

Figure 18:
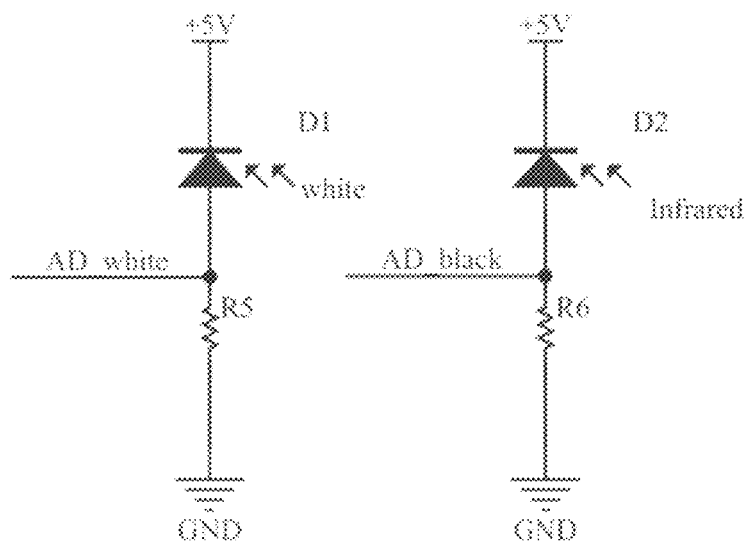
FIG. 18 is a connection circuit diagram of an ambient light detecting element and the control chip of the smart driving system of the present disclosure.

Referring to FIG. 18, in an embodiment of the present disclosure, the control chip 241 further includes a third entering end AD white/AD black electrically connected to an ambient light detecting element D1/D2, the ambient light detecting element D1/D2 is configured to detect an ambient light, and trigger the control chip 241 to work when a brightness value of a detected ambient light reaches a preset threshold, and the adjusting output PWM is configured to output the electrical signals.

Figure 19:
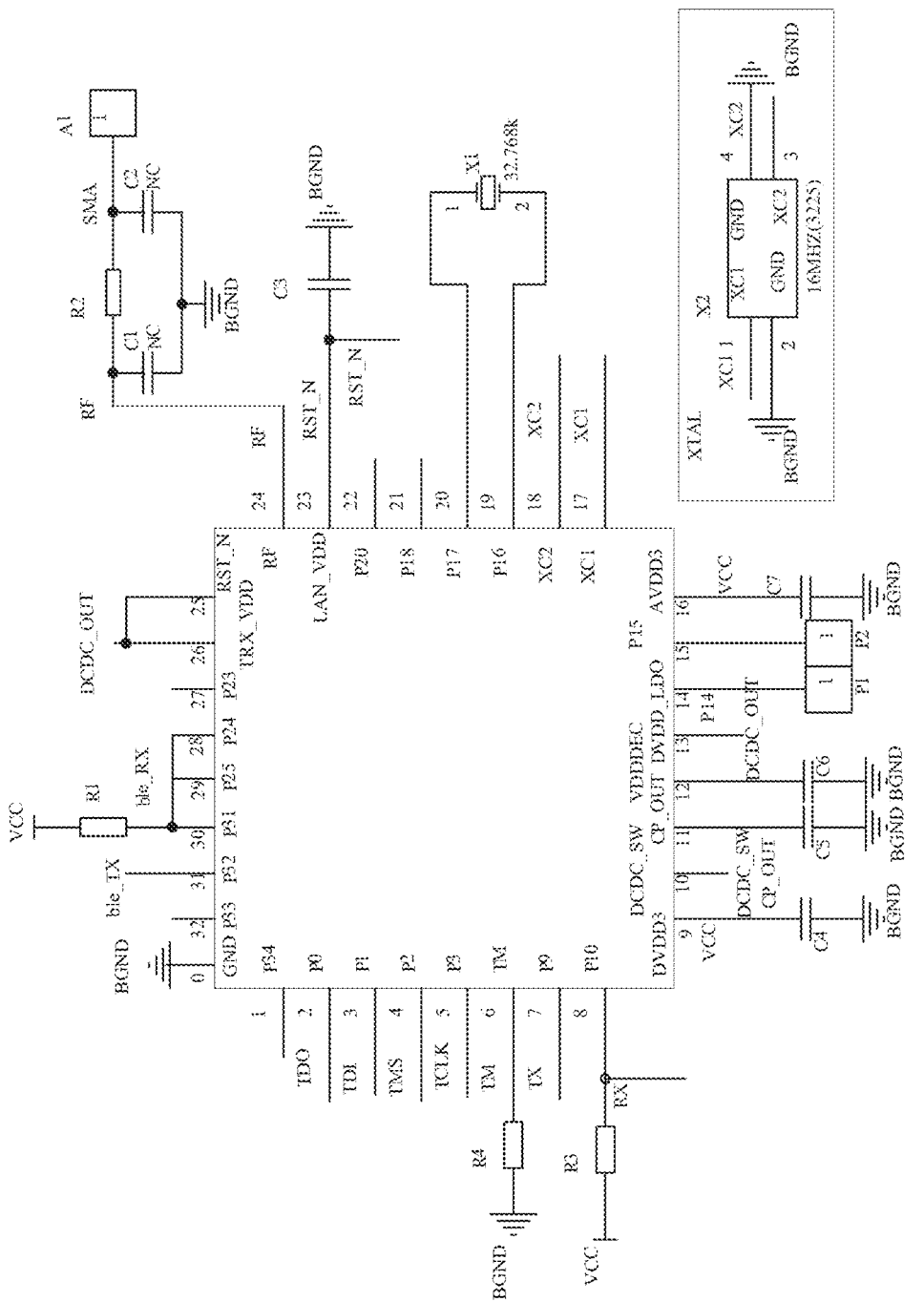
FIG. 19 is a connection circuit diagram of a Bluetooth module and the control chip of the smart driving system of the present disclosure.

Referring to FIG. 19, in an embodiment of the present disclosure, the control chip further includes a fourth entering end MCU TX/MCU RX electrically connected to a Bluetooth module 2412. The Bluetooth module 2412 includes a Bluetooth receiving element X1 and a Bluetooth processing chip 2413 connected to the Bluetooth receiving element X1. The Bluetooth processing chip 2413 includes two Bluetooth outputs ble_TX/ble_RX respectively connected to the fourth entering end MCU TX/MCU RX. When the Bluetooth output ble_TX/ble_RX outputs the electrical signals, the control chip 241 is worked and the adjusting output PWM is configured to output the electrical signals.

Figure 20:
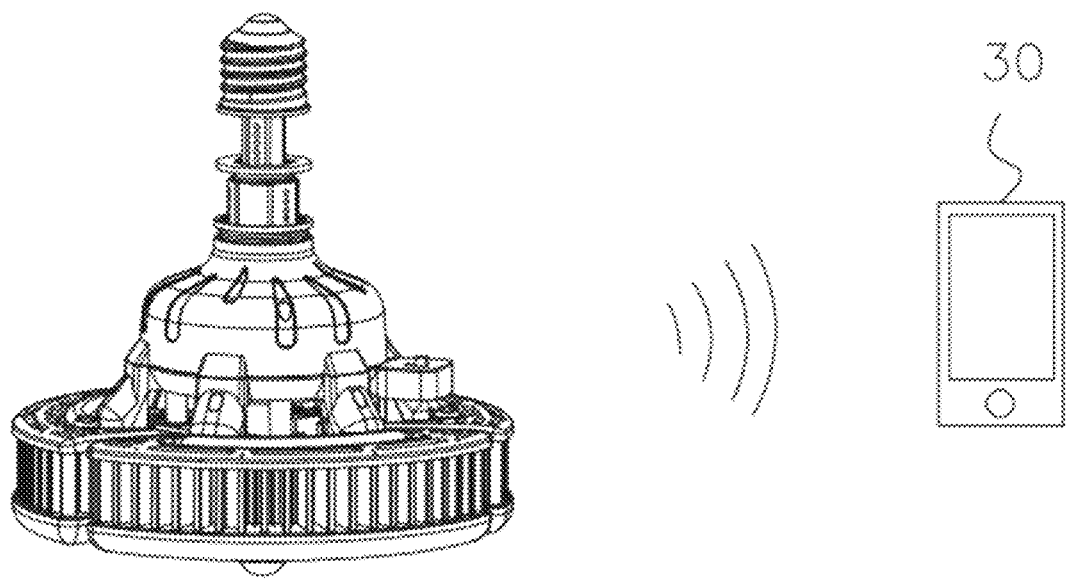
FIG. 20 is a schematic view of a smart device and the LED light of the present disclosure.

Referring to FIG. 20, furthermore, the Bluetooth receiving element X1 is connected with a smart device 30 via a Bluetooth for receiving control instructions of the smart device 30. The smart device 30 is configured to customize the lighting state of the LEDs 23 by the trigger and signal detecting unit 24 and the adjusting control unit 25.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An LED light comprising:
a body;
a holder, with an end connecting to the body and an opposite end connecting to an utility network, comprising a connector, and a telescopic member connected between the connector and the body;
and wherein the telescopic member can be stretched or contracted to adjust a length of the holder along an axial direction of the LED light, wherein the telescopic member comprises at least one telescopic unit, the at least one telescopic unit comprising:
a sleeve comprising a receiving hole formed on a sidewall thereof; a sliding member arranged in the sleeve and sliding relative to the sleeve, and comprising at least one inner recess formed along a sliding direction thereof, the inner recess formed opposite to the receiving hole;
a ball movably received in the receiving hole, a moving direction of the ball perpendicular to the sliding direction of the sliding member;
an adjusting ring sleeved around the sleeve and sliding relative to the sleeve to drive the ball to move during a sliding process, so that the ball can be pressed by the adjusting ring into the inner recess to position the telescopic member after the telescopic member is stretched or contracted.

2. The LED light as claimed in claim 1, wherein a plurality of inner recesses is arranged in vertical rows on the sliding member and opposite to the receiving hole during sliding the sliding member, the ball resisted against any one of the plurality of inner recesses to position the telescopic member.

3. The LED light as claimed in claim 2, wherein two receiving holes are arranged on two opposite sides of the sleeve, and the plurality of inner recesses is arranged in two vertical rows so that the two vertical rows of the inner recesses are respectively opposite to the two receiving holes.

4. The LED light as claimed in claim 1, wherein a bore diameter of the receiving hole is gradually increased from an inner wall of the sleeve to an outer wall of the sleeve; the bore diameter of the receiving hole on the inner wall of the sleeve is less than a diameter of the ball, and the bore diameter of the receiving hole on the outer wall of the sleeve is greater than the diameter of the ball.

5. The LED light as claimed in claim 4, wherein the adjusting ring comprises:
a vertical surface sleeved around the outer wall of the sleeve and sliding on the outer wall;
a horizontal surface perpendicular to the outer wall of the sleeve;
a slant surface connected between the vertical surface and the horizontal surface, and comprising a first end connected to the vertical surface and a second end connected to the horizontal surface; and wherein
the LED light further comprises an elastic element, with one end connecting with the sleeve and the other end resisting against the bottom of the horizontal surface, configured to push the adjusting ring away from the sleeve.

6. The LED light as claimed in claim 5, wherein the sleeve comprises a first limiting ring positioned above the first end and protruding out of the outer wall of the sleeve.

7. The LED light as claimed in claim 6, wherein the adjusting ring comprises a second limiting ring formed on the second end thereof and protruding out of the slant surface, a distance between the second limiting ring and the outer wall of the sleeve is less than the diameter of the ball.

8. The LED light as claimed in claim 7, wherein the adjusting ring further comprises an opening formed from the horizontal surface along the slant surface, and the opening is opposite to the receiving hole when the adjusting ring is slid, the ball rolled into the receiving hole from the opening.

9. The LED light as claimed in claim 1, wherein the telescopic member comprises a plurality of telescopic units, the sleeve of one telescopic unit is used as the sliding member connected to the other telescopic unit.

10. An LED light comprising a body and a holder connected to the body, the body comprising:
a shell fixed with the holder and comprising an inner cavity for receiving a power drive therein;
a connecting rod extending outward from the shell and communicated with the inner cavity;
a heat sink connected to the shell and surrounding around the outer of the connecting rod;
a light emitting unit fixed on the heat sink and electrically connected to the power drive; or
the body further comprising a function extension unit detachably connected to the connecting rod and electrically connected to the power drive, the function extension unit configured to receive signals and/or detect data and send electrical signals to the power drive to drive the light emitting unit to work in different states.

11. The LED light as claimed in claim 10, wherein the connecting rod comprises a connecting plate formed on an end thereof far away from the shell, and comprising at least two conducting rings concentrically insulated from each other and respectively connected to the power drive by a corresponding cable; and
the function extension unit comprising:
a housing comprising a connecting portion fixed with the connecting rod;
a first function board arranged in the housing and comprising a pin electrically connected to the conducting ring and extending outward from the housing; wherein the pin is connected with the conducting ring when the housing is connected to the connecting rod so as to transmit electrical signals therebetween.

12. The LED light as claimed in claim 11, wherein the pin is made of elastic material and comprises a plurality of terminals formed thereon, and a number of the terminals is same as that of the conducting rings.

13. The LED light as claimed in claim 10, wherein the LED light further comprises a control box detachably fixed with the shell and comprising a second function board, and the function board is electrically connected to the power drive to adjust a work state of the power drive.

14. A smart driving system of an LED light comprising:
a power conversion unit and at least one string of LEDs electrically connected to a mains interface in turn, the power conversion unit configured to drive the LEDs to emit light;
a triggering and signal detecting unit configured to obtain detecting signals via at least one detecting element and send out adjustment trigger signals according to the detecting signals;
an adjusting and control unit electrically connected to the triggering and signal detecting unit, and configured to receive the adjustment trigger signals transmitted from the triggering and signal detecting unit, and transform the adjustment trigger signals into adjustment commands and then send the adjustment commands to the power conversion unit; and
the power conversion unit configured to make a driving change according to the adjusting commands so as to drive the LEDs to change a lighting state of the LEDs.

15. The smart driving system of an LED light as claimed in claim 14, wherein there are at least two strings of LEDs, and the power conversion unit is configured to drive at least one string of LEDs to change the lighting state of the LEDs after receiving the adjustment commands.

16. The smart driving system of an LED light as claimed in claim 14, wherein the driving change made by the power conversion unit comprises a duty ratio of power on time in each Power-on-Hours of the at least one string of LEDs is changed so as to change a lighting color temperature of the LEDs.

17. The smart driving system of an LED light as claimed in claim 16, wherein the adjusting and control unit comprises:
a first port configured to receive the adjustment trigger signals transmitted from the triggering and signal detecting unit;
a differential input module electrically connected to a back-end of the first port and configured to remove interferences and improve a signal sensitivity of the LED light;
an optocoupler conversion module configured to receive differential signals transmitted from the differential input module and convert the differential signals into coupling signals;
a front-end changing module and/or a back-end changing module;
the front-end changing module configured to receive the coupling signals transmitted from the optocoupler conversion module and process the coupling signals, and then send the coupling signals after being processed to the power conversion unit so that the power conversion unit can make the driving change according to the coupling signals; and
the back-end changing module configured to receive the coupling signals and process the coupling signals, and then send the coupling signals after being processed to a front-end of the LEDs so as to change the lighting state of the LEDs.

18. The smart driving system of an LED light as claimed in claim 17, wherein the trigger and signal detecting unit comprises a control chip, the control chip comprising an adjusting output, and a data matching module connected between the adjusting output and the first port, the control chip configured to receive electrical signals of the adjusting output and convert the electrical signals into the adjustment trigger signals and then send the adjustment trigger signals to the first port.

19. The smart driving system of an LED light as claimed in claim 18, wherein the control chip comprises a first entering end, and/or a second entering end, and/or a third entering end, and/or a fourth entering end;

the first entering end electrically connected to a button configured to trigger the control chip to work, and the adjusting output is configured to output the electrical signals;

the second entering end electrically connected to a pyroelectric infrared element configured to detect a moving infrared signal and output the adjustment trigger signal to trigger the control chip to work, and the adjusting output is configured to output the electrical signals;

the third entering end electrically connected to an ambient light detecting element configured to detect ambient light, and trigger the control chip to work when a brightness value of a detected ambient light reaches a preset threshold, and the adjusting output is configured to output the electrical signals;

the fourth entering end electrically connected to a Bluetooth module comprising a Bluetooth receiving element and a Bluetooth processing chip connected to the Bluetooth receiving element, the Bluetooth processing chip comprising two Bluetooth outputs respectively connected to the fourth entering end; when the Bluetooth output outputting the electrical signals, the control chip is worked, and the adjusting output is configured to output the electrical signals; and wherein the Bluetooth receiving element is connected with a smart device via a Bluetooth for receiving control instructions of the smart device; and the smart device is configured to customize the lighting state of the LEDs by the triggering and signal detecting unit and the adjusting control unit.

* * * * *